US008157516B2

(12) United States Patent
Chen et al.

(10) Patent No.: US 8,157,516 B2
(45) Date of Patent: Apr. 17, 2012

(54) COMPRESSOR WHEEL HOUSING

(75) Inventors: Hua Chen, Lancashire (GB); Bill Connor, Lancashire (GB); Nathan McArdle, West Yorkshire (GB)

(73) Assignee: Honeywell International Inc., Morristown, NJ (US)

( * ) Notice: Subject to any disclaimer, the term of this patent is extended or adjusted under 35 U.S.C. 154(b) by 866 days.

(21) Appl. No.: 11/660,457

(22) PCT Filed: Aug. 19, 2004

(86) PCT No.: PCT/GB2004/003559
§ 371 (c)(1),
(2), (4) Date: Oct. 2, 2008

(87) PCT Pub. No.: WO2006/018591
PCT Pub. Date: Feb. 23, 2006

(65) Prior Publication Data

US 2009/0060731 A1 Mar. 5, 2009

(51) Int. Cl.

| | |
|---|---|
| ***F01D 1/02*** | (2006.01) |
| ***F01D 5/20*** | (2006.01) |
| ***F03D 3/04*** | (2006.01) |
| ***F04D 29/44*** | (2006.01) |
| ***F04D 29/54*** | (2006.01) |

(52) U.S. Cl. .................. 415/206; 415/211.2; 415/173.1; 415/199.1

(58) Field of Classification Search .................. 415/206, 415/211.2, 173.1, 204, 199.2, 199.1
See application file for complete search history.

(56) References Cited

U.S. PATENT DOCUMENTS

| | | | | |
|---|---|---|---|---|
| 3,289,921 | A | 12/1966 | Soo | |
| 3,997,281 | A | 12/1976 | Atkinson | |
| 2003/0235497 | A1 | 12/2003 | Meng | |
| 2007/0224032 | A1 * | 9/2007 | Gu et al. | 415/58.4 |

FOREIGN PATENT DOCUMENTS

| | | |
|---|---|---|
| DE | 204622 | 11/1907 |
| DE | 4027174 | 3/1992 |
| DE | 4106614 | 3/1992 |
| DE | 4031936 | 4/1992 |
| DE | 10017808 | 6/2001 |
| DE | 10207456 | 4/2003 |
| GB | 1447013 | 8/1974 |
| JP | 03-260399 | 11/1991 |
| WO | 0019107 | 4/2000 |

OTHER PUBLICATIONS

Study (Deutsches Gebrauchsmuster).
PCT ISR/WO Honeywell.

* cited by examiner

*Primary Examiner* — Chuong A. Luu
(74) *Attorney, Agent, or Firm* — Brian Pangrle

(57) ABSTRACT

An exemplary compressor wheel housing for a turbocharger compressor wheel includes a substantially cylindrical shroud surface definable with respect to a radial dimension and an axial dimension along a rotational axis of a compressor wheel with an origin coincident with a z-plane of the compressor wheel wherein the axial position of the shroud surface decreases with increasing radial position to a compressor wheel blade outer edge radius and a diffuser surface extending radially outward and axially downward from the cylindrical shroud surface wherein the diffuser surface includes a minimum diffuser surface axial position at a radial position less than about 1.25 times the compressor wheel blade outer edge radius and wherein the diffuser surface includes a greater axial position at a radial position beyond that corresponding to the minimum axial position. Various other exemplary methods, devices, systems, etc., are also disclosed.

10 Claims, 11 Drawing Sheets

700

800

900

1100

COMPRESSOR WHEEL HOUSING

TECHNICAL FIELD

Subject matter disclosed herein relates generally to centrifugal compressor assemblies and, in particular, compressor housings suitable for housing a compressor wheel for a turbocharger of an internal combustion engine.

BACKGROUND

Efficiency in a centrifugal compressor with a vaneless diffuser housing can be affected by diffuser housing shape. Conventional housings use a pinch section followed by a parallel section that extends to the compressor scroll wherein the pinch section provides a throttle near the compressor wheel exit while the parallel section provides for diffusion. Various exemplary pinch and/or diffuser sections are disclosed herein that provide for increases in efficiency, for example, when compared to various conventional housings.

According to one aspect of the present invention there is provided a compressor wheel housing for a turbocharger compressor wheel the housing comprising: a substantially cylindrical shroud surface definable with respect to a radial dimension and an axial dimension along a rotational axis of a compressor wheel with an origin coincident with a z-plane of a compressor wheel wherein the axial position of the shroud surface decreases with increasing radial position to a compressor wheel blade outer edge radius; and a diffuser surface extending radially outward and axially downward from the cylindrical shroud surface, wherein the diffuser surface includes a minimum diffuser surface axial position at a radial position less than about 1.25 times the compressor wheel blade outer edge radius and wherein the diffuser surface includes a greater axial position at a radial position beyond that corresponding to the minimum axial position.

According to a second aspect of the present invention there is provided a compressor wheel housing for a turbocharger compressor wheel, the housing comprising: a substantially cylindrical shroud surface definable with respect to a radial dimension and an axial dimension along a rotational axis of a compressor wheel with an origin coincident with a z-plane a compressor wheel wherein the axial position of the shroud surface decreases with increasing radial position to a compressor wheel blade outer edge radius at an angle of about 20 degrees or less with respect to the z-plane; and a diffuser surface extending radially outward and axially downward from the cylindrical shroud surface wherein the diffuser surface includes a minimum diffuser surface axial position at a radial position less than about 1.25 times the compressor wheel blade outer edge radius and wherein diffuser surface approaches the minimum at an angle of about 10 degrees or less with respect to the z-plane.

BRIEF DESCRIPTION OF THE DRAWINGS

A more complete understanding of the various methods, systems, arrangements, etc., described herein, and equivalents thereof, may be had by reference to the following detailed description when taken in conjunction with the accompanying drawings wherein.

DETAILED DESCRIPTION

Figure 1:
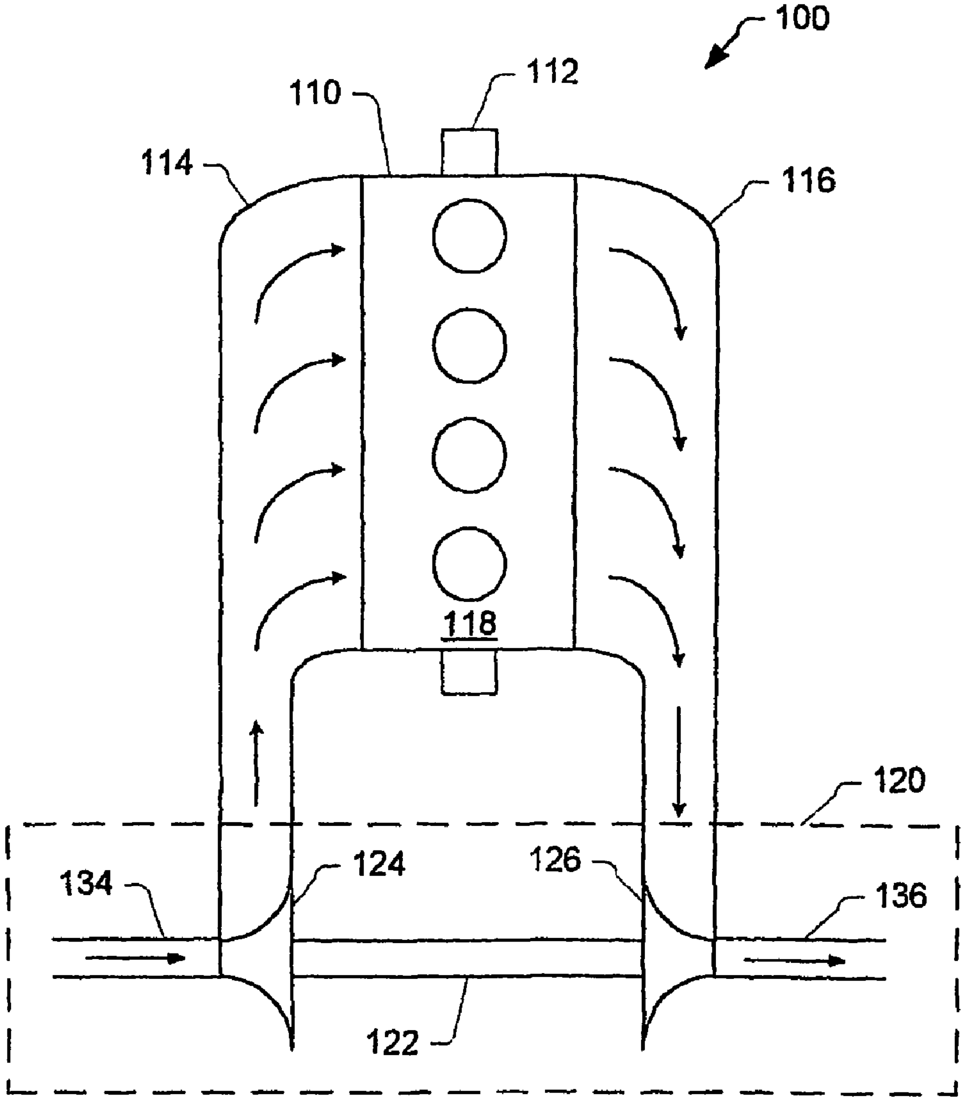
Fig. 1 (Prior Art)
FIG. 1 is a simplified approximate diagram illustrating an exemplary system that includes a turbocharger and an internal combustion engine.

FIG. 1 shows an exemplary system 100 that includes an exemplary internal combustion engine 110 and an exemplary turbocharger 120. The internal combustion engine 110 includes an engine block 118 housing one or more combustion chambers (e.g., cylinders, etc.) that operatively drive a shaft 112. As shown in FIG. 1, an intake port 114 provides a flow path for intake air to the engine block 118 while an exhaust port 116 provides a flow path for exhaust from the engine block 118.

The exemplary turbocharger 120 acts to extract energy from the exhaust and to use this energy to boost intake charge pressure (e.g., pressure of intake air, etc.). As shown in FIG. 1, the turbocharger 120 includes a shaft 122 having a compressor 124, a turbine 126, an intake 134, and an exhaust outlet 136. Exhaust from the engine 110 diverted to the turbine 126 causes the shaft 122 to rotate, which, in turn, rotates the compressor 124. When rotating, the compressor 124 energizes intake air to produce a "boost" in intake air pressure (i.e., force per unit area or energy per unit volume), which is commonly referred to as "boost pressure." In this manner, a turbocharger may help to provide a larger mass of intake air (typically mixed with a carbon-based and/or hydrogen-based fuel) to the engine, which translates to greater engine output during combustion.

An exhaust turbine or turbocharger optionally includes a variable geometry mechanism or other mechanism to control flow of exhaust to the exhaust turbine. Commercially available variable geometry turbochargers (VGTs) include, but are not limited to, the GARRETT® VNT™ and AVNT™ turbochargers, which use multiple adjustable vanes to control the flow of exhaust through a nozzle and across a turbine. Further, the exemplary system 100 may include a turbocharger or compressor having an associated electric motor and/or generator and associated power electronics capable of accelerating and/or decelerating a shaft (e.g., compressor shaft, turbine shaft etc.). Power electronics may operate on DC power and generate an AC signal to drive a motor and/or generator.

Figure 2:
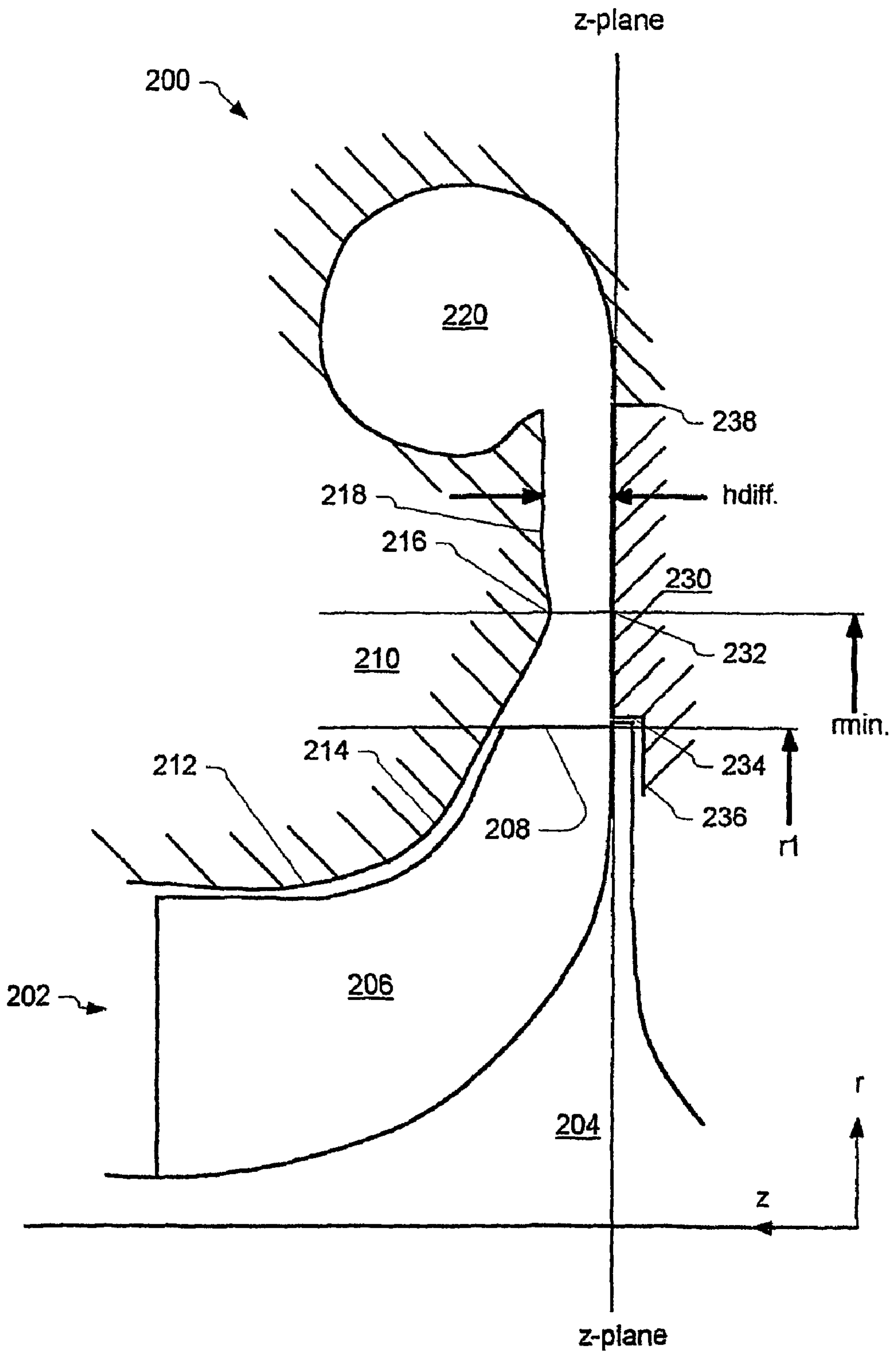
FIG. 2 is a cross-sectional view of an exemplary compressor assembly having a compressor housing that includes a diffuser with converging and diverging wall section.

FIG. 2 shows a cross-sectional view (r-z plane of constant $\phi$) of a compressor assembly 200 that includes a compressor wheel 202, an exemplary compressor housing 210 and a plate 230. The compressor wheel 202 includes a rotor 204 centered on an axis and having one or more blades 206 wherein each blade has an outer edge 208. As shown, the outer edge 208 of the blade 206 has a radius $r_1$, as measured from the axis of the rotor 204. Various features may be described with respect to the r-axis and/or the z-axis, which is the axis of rotation of the compressor wheel 202. For example, a compressor wheel includes a z-plane at or proximate to the lower point of the outer edge 208 of a blade. In various examples, the z-plane may serve as an origin for a z-axis.

The exemplary compressor housing 210 includes a substantially axial shroud wall section 212, a contoured shroud wall section 214 that leads to a diffuser section at radius greater than the radius $r_1$. This diffuser section is further divided between and a converging and diverging diffuser wall section 216 and a substantially parallel diffuser wall section 218 that leads to a compressor scroll 220. A surface contour of the housing 210 is substantially cylindrical for the shroud section 212, which also decreases in axial dimension with increasing radius to a radius $r_1$. At radius $r_1$, the shroud section transitions to a diffuser section, defined in part by a diffuser surface or wall.

A parallel diffuser wall section infers a constant separation between an upper surface and a lower surface. In general, the upper surface is a surface of a housing or a component thereof and the lower surface is a surface of a plate. While such surfaces may exhibit some variation in their position along the z-axis, the spacing between the surfaces remains substantially constant with respect to increasing radius in the parallel diffuser wall section.

In this example, the plate 230 extends from an inner wall 234 located at approximately the outer edge 208 of the blade 206 (e.g., radius $r_1$) to an outer wall 238 proximate to the scroll 220 and distal end of the diffuser section. The plate has an upper surface 232 that extends from the inner wall 234 to the outer wall 238 and forms a lower wall of the diffuser section. As shown, the substantially parallel diffuser wall section 218 is substantially parallel to the upper surface 232 of the plate 230 and has a height $h_{diff.}$ along the axis. In the parallel diffuser wall section 218, $h_{diff}$ is substantially constant with respect to dimension r, i.e., $h_{diff}(r)=h_{||}+/-\epsilon$, where $\epsilon$ is a small deviation value compared to $h_{||}$.

In the example of FIG. 2, most wall divergence occurs over the diverging portion of the diverging wall section 216 and at greater diameters or radii the wall section is substantially parallel, especially as it approaches the scroll 220. The converging and diverging diffuser wall section 216 has a minimum height with respect to the upper surface 232 of the plate 230, wherein the minimum height (e.g., $h_{min}$) occurs at a radius $r_{min}$.

In general, a conventional compressor assembly has a parallel diffuser section wherein a majority of the diffusion occurs. In such diffuser sections, wall friction will increase as the diffuser height decreases. In turn, compressor efficiency decreases significantly with decreasing diffuser height of such a parallel diffuser section. In addition, due to the geometry, overall flow area in z$\phi$-plane increases with increasing radius, which acts to reduce gas velocity along the r-axis and gas mixing.

According to the exemplary compressor assembly 200, the converging and diverging diffuser wall section 216 provides for improved efficiency and/or performance. In particular, the converging section acts as a pinch that provides a throttle near the compressor wheel exit (thus establishing more uniform flow through the diffuser) while the diverging section acts to reduce wall friction (thus increasing the 'hydraulic radius' of the diffuser). Diffusion can occur over the diverging section and act to further stabilize flow and enhance effectiveness of the diffuser.

Figure 3:
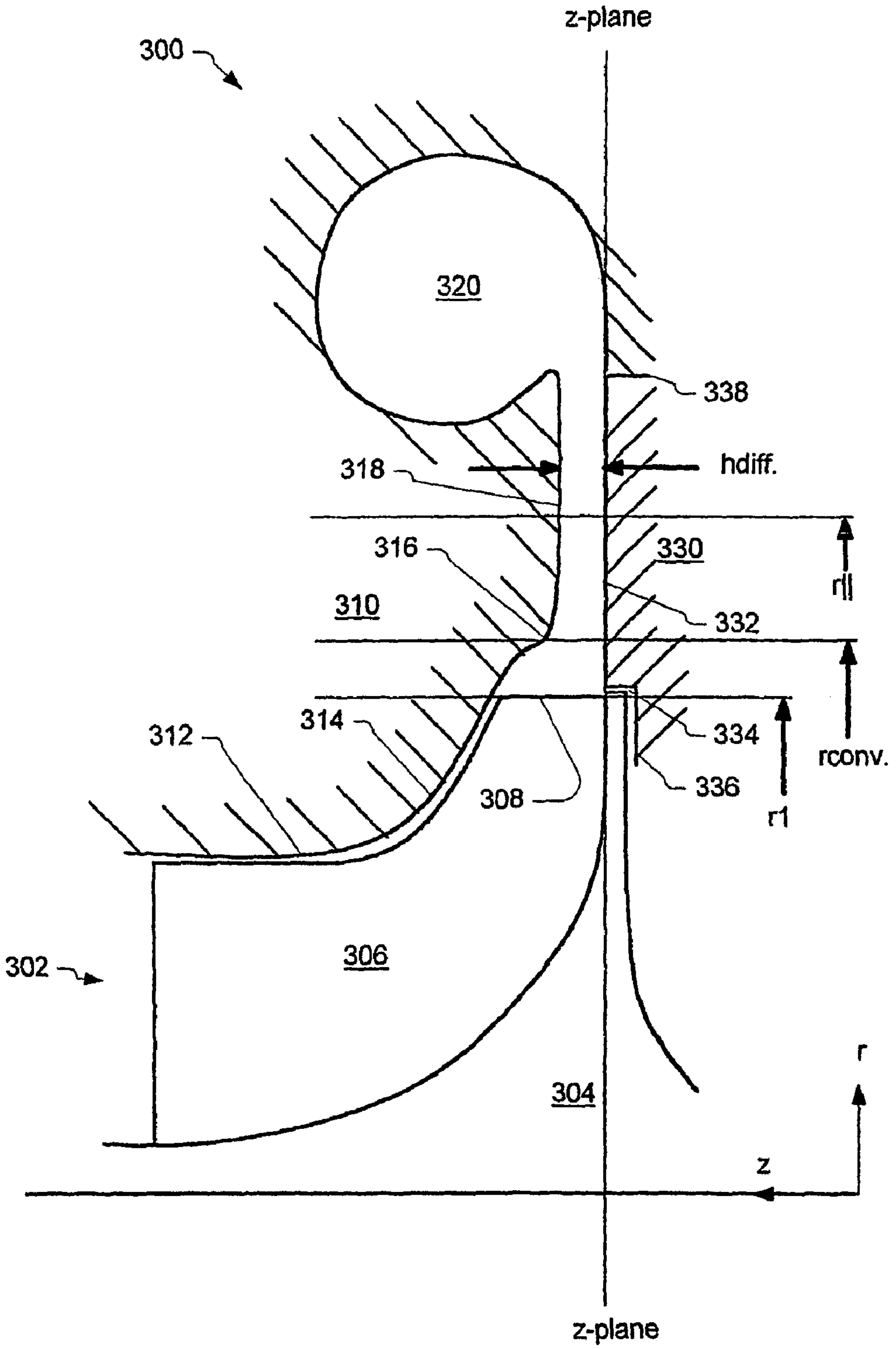
FIG. 3 is a cross-sectional view of an exemplary compressor assembly having a compressor housing that includes a diffuser with an early converging section.

FIG. 3 shows a cross-sectional view (r-z plane of constant $\phi$) of a compressor assembly 300 that includes a compressor wheel 302, an exemplary compressor housing 310 and a plate 330. The compressor wheel 302 includes a rotor 304 centered on an axis and having one or more blades 306 wherein each blade has an outer edge 308. As shown, the outer edge 308 of the blade 306 has a radius $r_1$, as measured from the z-axis of the rotor 304. The exemplary compressor housing 310 includes a substantially axial shroud wall section 312, a contoured shroud wall section 314 that leads to a diffuser section at radii greater than the radius $r_1$, a converging diffuser wall section 316 and a substantially parallel diffuser wall section 318 that leads to a compressor scroll 320. In this example, the plate 330 extends from an inner wall 334 located at approximately the outer edge of the blade 308 (e.g., radius $r_1$) to an outer wall 338 proximate to the scroll 320 and distal end of the diffuser section. The plate has an upper surface 332 that extends from the inner wall 334 to the outer wall 338 and forms a lower wall of the diffuser section. As shown, the substantially parallel diffuser wall section 318 is substantially parallel to the upper surface 332 of the plate 330 and has a height $h_{diff}$ along the z-axis. In this example, most diffuser wall convergence occurs over the converging wall section 316, which is positioned at a radius $r_{conv.}$ between the radius $r_1$ (e.g., approximately the outer edge 308 of the blade 306) and beginning of the substantially parallel diffuser wall section 318, which commences at a radius $r_{||}$. The converging wall section 316 converges to a minimum height (e.g., $h_{min}$) with respect to the upper surface 332 of the plate 330, wherein the minimum height occurs at the radius $r_{||}$ or at a radius greater than $r_{||}$).

In general, efficiency of a centrifugal compressor with a vaneless housing for turbocharger applications depends on diffuser shape. Conventional compressor housings typically include a shroud wall contour that extends from the same radius as the compressor wheel exit edge 308 at radius $r_1$ via a line with the same slope as the shroud side of the wheel exit in r-z plane. This angled line of increasing radius and decreasing axial dimension forms a diffuser pinch section, which then extends in a radial direction to form a substantially parallel diffuser section. In the exemplary compressor assembly 300, the compressor housing 310 has a curved, converging wall section that converges to form a diffuser pinch section at a radius less than that typically used in conventional compressor housings for turbochargers.

With respect to fluid dynamics, as fluid exits the compressor wheel (e.g., at radii greater than $r_1$), fluid mixing occurs, which can have an associated and significant mixing loss that acts to reduce compressor efficiency. In general, diffuser effectiveness depends on fluid inflow characteristics at this entry point A uniform flow field with a thin boundary layer is typically more effective than a flow field with low momentum regions and a thicker boundary layer. According to the exemplary compressor housing 310, the early pinch generates an early and strong acceleration of the fluid at the compressor wheel exit. In turn, this produces at the diffuser entry a more uniform flow field with a thinner boundary layer. Such a flow field is better prepared for subsequent diffusion and hence, mixing loss at compressor wheel exit is reduced.

Various exemplary compressor housings described herein include a converging and diverging wall section and/or an early converging section such as, but not limited to, those described above with respect to FIGS. 2 and 3. In particular, a detailed description follows of an exemplary compressor housing having a converging and diverging section followed by a detailed description of an exemplary compressor housing having an early converging section. Characteristics of such examples may be combined, for example, in an exemplary compressor housing having an early converging section and a diverging section.

Figure 4:
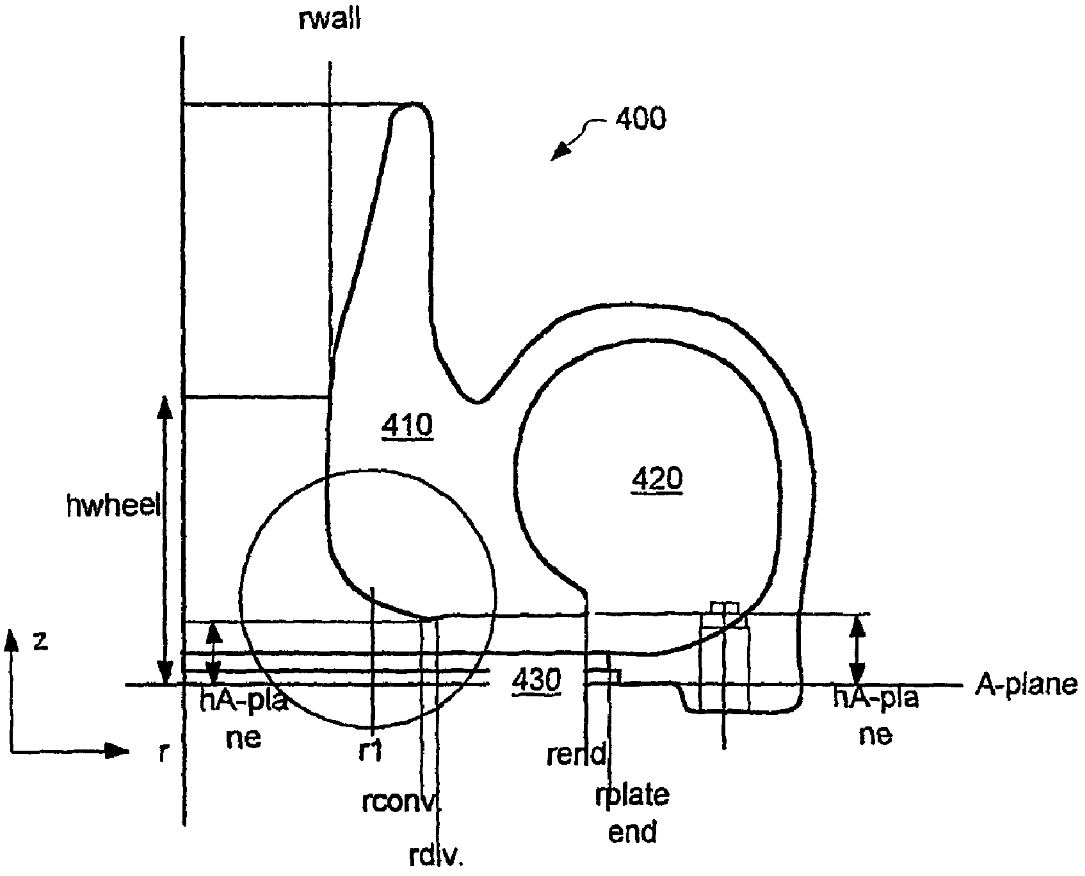
FIG. 4 is a cross-sectional view of an exemplary compressor housing that includes a converging and diverging wall section.

FIG. 4 shows a cross-sectional view (r-z plane) of an exemplary compressor assembly 400. The exemplary compressor assembly 400 includes a plate 430 and compressor housing 410 having a converging and diverging diffuser wall section. The compressor housing 410 also forms a compressor scroll 420. In one example, the exemplary compressor housing 410 has the following dimensions given in radii from a center axis and normalized with respect to $r_1$, which is the radius of the outer edge of the compressor wheel blade(s):

| Feature | Dimension | Normalized |
|---|---|---|
| $r_{wall}$ | 19.62 mm | 0.8175 |
| $r_1$ | 26 mm | 1 |
| $r_{conv.}$ | 28.08 mm | 1.08 |
| $r_{div.}$ | 31.20 mm | 1.20 |
| $r_{end}$ | 46.60 mm | 1.79 |

According to this example, an exemplary compressor housing includes a converging and diverging wall section at a location having a dimensionless radius (i.e. the radius normalized against $r_1$) less than approximately 1.2, and a diffuser section that joins a compressor scroll at a dimensionless radius of approximately 1.8 or greater. In this example, the converging and diverging section occurs at a radius of approximately two-thirds or less the radius of the point at which the diffuser section joins the compressor scroll.

In this example, the compressor wheel exit has an axial dimension of 4.00 mm, the diffuser has a maximum axial dimension of 3.30 mm at the parallel section, and a minimum axial dimension of 2.97 mm at $r_{conv}$ as measured from the upper surface of a lower plate that defines the diffuser. The annulus area of the compressor wheel exit is approximately 653 $mm^2$ (4.00 mm*π*2*26 mm), the annulus area ratio of the diffuser at $r_{conv}$ to the wheel exit is approximately 0.80 or less, and the diffuser annulus area ratio at $r_{div}$ to $r_{conv}$ is about 1.25 or more. While the dimensions are set forth as radii, diameters may be used. Further, various surfaces may be described as functions of dimensions r and/or z. In this example, the A-plane may be used to characterize axial dimension as well, noted as $h_{A\text{-}plane}$. For example, a diffuser upper surface may include $h_{A\text{-}plane}$ of about 6.59 mm at $r_{conv.}$ and $h_{A\text{-}plane}$ of about 6.92 mm at a parallel section of the diffuser. Thus, the axial dimension is a function of radial dimension and varies over at least part of the diffuser. A wheel dimension $h_{wheel}$ is also referenced in FIG. 4 as being measured from the A-plane.

Various exemplary housings disclosed herein aim to reduce a tangential component of flow, for example, tangential velocity. In a conventional housing, cross-sectional area and flow volume increase with increasing radius. While an exemplary housing may exhibit increasing cross-sectional area and flow volume with respect to radius, inclusion of a converging wall section acts to decrease cross-sectional area and flow volume with respect to radius when compared to the relationships found in a conventional housing. As described herein, changes in axial dimension of a flow passage and annulus area (i.e., cross-sectional area) have a substantial effect on surface friction and diffuser losses. Such changes affect radial component of flow, for example, radial velocity. An exemplary housing can act to increase radial velocity and thereby reduce risk of stall and surge. Stall and surge are typically associated with inadequate flow, which may be characterized by an inadequate radial component of the flow (e.g., inadequate radial velocity).

Figure 5A:
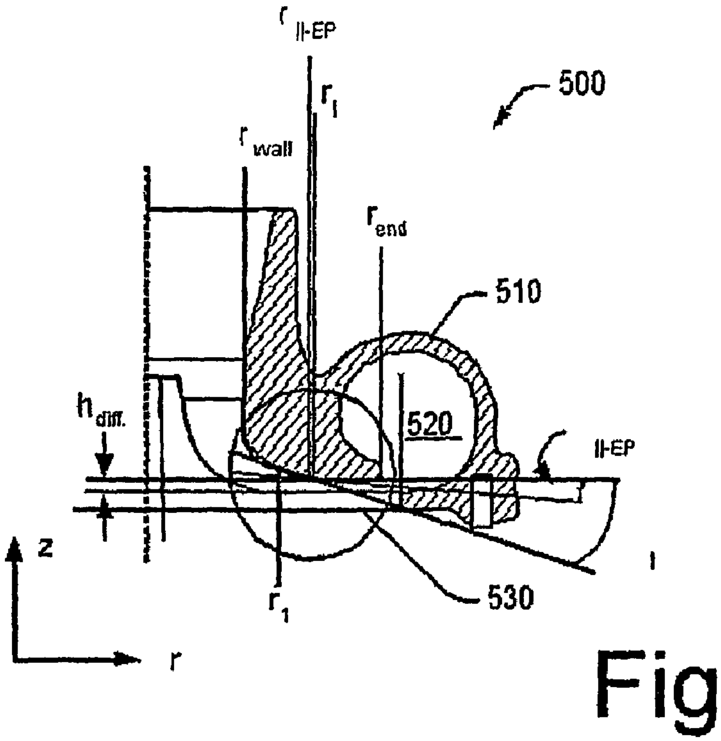
FIG. 5A is a cross-sectional view of an exemplary compressor housing that includes an early pinch or converging wall section.

FIG. 5A shows a cross-sectional view (r-z plane) of an exemplary compressor assembly 500. The exemplary compressor assembly 500 includes a plate 530, an edge of which defines a bottom boundary of the diffuser and compressor housing 510 having an early converging wall section. The compressor housing 510 also forms a compressor scroll 520. The compressor housing 510 has various dimensions that include an inner wall radius $r_{wall}$, a radius $r_{||}$ at which point the diffuser section wall becomes substantially parallel to an upper surface of the plate 530, a radius $r_{end}$ at which the diffuser section joins the compressor scroll 520. In this example, a radius $r_{||}$ is shown for a conventional compressor housing and a radius $r_{||\text{-}EP}$ is shown for an exemplary compressor housing having an early pinch or converging section. The exemplary compressor housing 510 also includes an angle $\Theta_{||\text{-}EP}$ that corresponds to the radius $r_{||\text{-}EP}$ and a conventional compressor housing angle $\Theta_{||}$ that corresponds to the radius $r_{||}$.

In one example, the exemplary compressor housing 510 has dimensions, as shown in Table 2, given in angles, height or radii from a center axis and where appropriate, normalized with respect to $r_1$, which is the radius of the outer edge of the compressor wheel blade(s).

TABLE 2

Dimensions of an Exemplary Compressor Housing

| Feature | Dimension | Normalized |
|---|---|---|
| $r_{wall}$ | 19.62 mm | 0.75 |
| $r_1$ | 26 mm | 1 |
| $h_{Blade}$ | 4.76 mm | 0.0915 |
| $h_{diff.}$ | 2.47 mm | 0.0475 |
| $h_{diff.}/h_{Blade}$ | | 0.52 |
| $r_{\|\|\text{-}EP}$ | 31.6 mm | 1.22 |
| $r_{\|\|}$ | 33.45 mm | 1.29 |
| $r_{end}$ | 46.60 mm | 1.79 |
| $\Theta_{\|\|}$ | 17.8 degrees | |
| $\Theta_{\|\|\text{-}EP}$ | 5 degrees | |

According to this example, an exemplary compressor housing includes a converging wall section at a location having a dimensionless radius less than approximately 1.25.

Figure 5B:
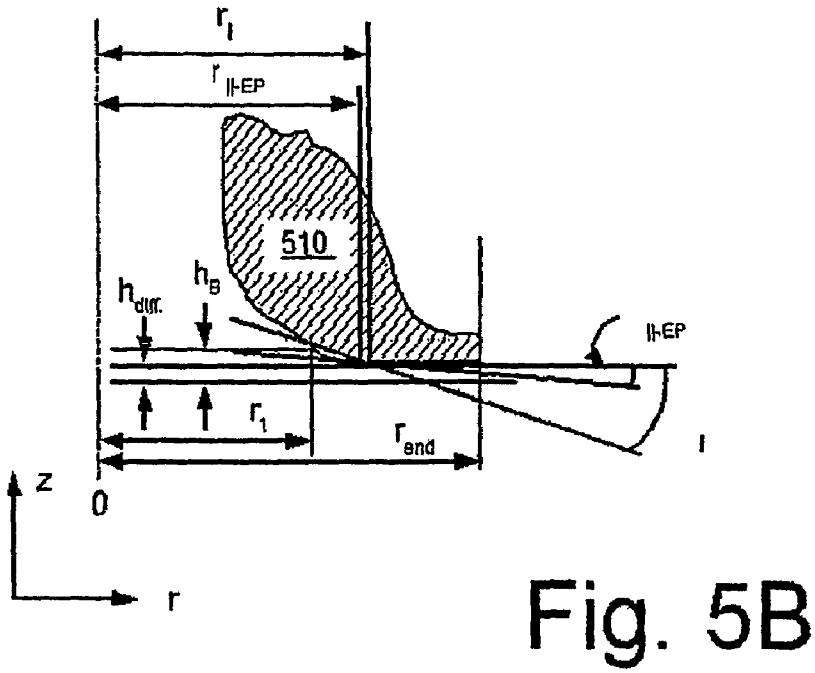
FIG. 5B is an enlarged view of the compressor housing of FIG. 5A

FIG. 5B shows an enlarged view of the exemplary compressor housing 510 that includes the angle $\Theta_{||\text{-}EP}$ that corresponds to the radius $r_{||\text{-}EP}$ and the conventional compressor housing angle $\Theta_{||}$ that corresponds to the radius $r_{||}$. In this example, the early pinch or convergence may be characterized by (i) a radius $r_{||\text{-}EP}$ at which the wall becomes substantially parallel and (ii) an angle of the wall at that radius $\Theta_{||\text{-}EP}$ that aligns with the surface of the wall as it approaches the radius $r_{||\text{-}EP}$. In this example, the radius at which the wall becomes substantially parallel to the upper surface of the plate 530 is substantially less than that for the conventional compressor housing (e.g., per $r_{||}$). Further, note that the angle for the conventional compressor housing is significantly greater than the angle for the exemplary compressor housing 510. FIG. 5B also shows the diffuser height $h_{diff}$, along the z axis and the blade height $h_B$ along the z axis at the outer edge of the blade at radius $r_1$.

An exemplary compressor wheel housing for a turbocharger compressor wheel includes a substantially cylindrical shroud surface definable with respect to a radial dimension and an axial dimension along a rotational axis of the compressor wheel with an origin coincident with a z-plane of the compressor wheel wherein the axial position of the shroud surface decreases with increasing radial position to a compressor wheel blade outer edge radius and a diffuser surface extending radially outward and axially downward from the cylindrical shroud surface wherein the diffuser surface includes a minimum diffuser surface axial position at a radial position less than about 1.25 times the compressor wheel blade outer edge radius and wherein the diffuser surface includes a greater axial position at a radial position beyond that corresponding to the minimum axial position. Such an exemplary compressor wheel housing optionally includes a diffuser surface having a section with a substantially constant axial position over radii of the section and/or a diffuser surface that extends radially outward to a scroll, wherein the scroll may vary with respect to angle about the axis.

Another exemplary assembly includes such an exemplary compressor wheel housing and a plate including a surface proximate to the z-plane and forming a diffuser section in conjunction with the diffuser surface of the housing wherein axial height of the diffuser section varies with respect to radial dimension for at least a portion of the diffuser section. Such an exemplary assembly optionally includes a diffuser section with an axial height that decreases and then increases to a substantially constant axial height with respect to increasing radius.

Another exemplary compressor wheel housing includes a substantially cylindrical shroud surface definable with respect to a radial dimension and an axial dimension along a rotational axis of a compressor wheel with an origin coincident with a z-plane a compressor wheel wherein the axial position of the shroud surface decreases with increasing radial position to a compressor wheel blade outer edge radius at an angle of about 20 degrees or less with respect to the z-plane and a diffuser surface extending radially outward and axially downward from the cylindrical shroud surface wherein the diffuser surface includes a minimum diffuser surface axial position at a radial position less than about 1.25 times the compressor wheel blade outer edge radius and wherein diffuser surface approaches the minimum at an angle of about 10 degrees or less with respect to the z-plane.

An exemplary assembly includes such an exemplary compressor wheel housing and a plate including a surface proximate to the z-plane and forming a diffuser section in conjunction with the diffuser surface of the housing wherein axial height of the diffuser section varies with respect to radial dimension for at least a portion of the diffuser section leading to the minimum diffuser axial position. Such an exemplary assembly optionally includes a diffuser section with an axial height that decreases to a minimum and then maintains a substantially constant axial height with respect to increasing radius (e.g., optionally at the minimum axial height).

FIGS. 6-11 show compressor flow maps for various exemplary compressor housings and/or conventional compressor housings, which are used as a baseline for comparison. In particular, FIGS. 6-8 pertain to compressor housings having an exemplary converging and diverging section while FIGS. 9-11 pertain to compressor housings having an exemplary early pinch or early converging section.

A compressor flow map, e.g., a plot of pressure ratio versus mass air flow, can help characterize performance of a compressor. In a flow map, pressure ratio is typically defined as the air pressure at the compressor outlet divided by the air pressure at the compressor inlet. Mass air flow may be converted to a volumetric air flow through knowledge of air density or air pressure and air temperature. Compression causes friction between air molecules and hence frictional heating. Thus, air at a compressor outlet generally has a considerably higher temperature than air at a compressor inlet and the compressor efficiency is always less than 1.

Compressor flow maps typically indicate compressor efficiency. Compressor efficiency depends on various factors, including pressure, pressure ratio, temperature, temperature increase, compressor wheel rotational speed, etc. In general, a compressor should be operated at a high efficiency or at least within certain efficiency bounds. One operational boundary is commonly referred to as a surge limit while another operational boundary is commonly referred to as a choke area. Compressor efficiency drops significantly as conditions approach the surge limit or the choke area. Choke area results from limitations associated with compressor wheel rotational speed and the speed of sound in air. In general compressor efficiency falls rapidly as the flow in the compressor wheel exceeds the speed of sound in air. Thus, a choke area limit typically approximates a maximum mass air flow regardless of compressor efficiency or compressor pressure ratio.

A surge limit exists for most compressor wheel rotational speeds and defines an area on a compressor flow map wherein a low mass air flow and a high pressure ratio cannot be achieved. In other words, a surge limit represents a minimum mass air flow that can be maintained at a given compressor wheel rotational speed and a given pressure difference between the compressor inlet and outlet. In addition, compressor operation is typically unstable in this area. Surge may occur upon a build-up of back pressure at the compressor outlet, which can act to reduce mass air flow through the compressor. At worst, relief of back pressure through the compressor can cause a negative mass air flow, which has a high probability of stalling the compressor wheel.

Figure 6:
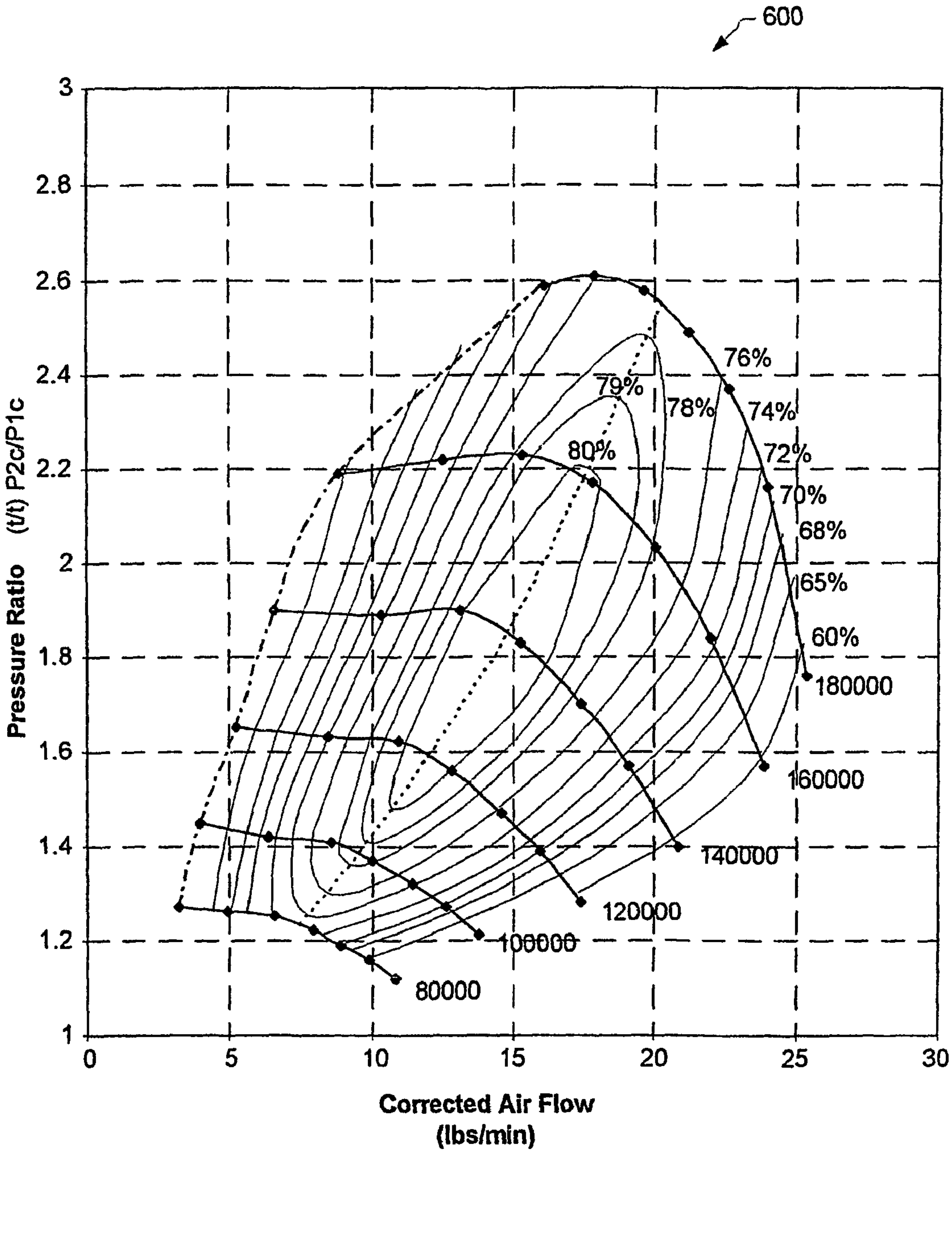
FIG. 6 is a plot of pressure ratio versus corrected air flow for an exemplary compressor housing having a converging and diverging wall section (approx. 3.00 mm to approx 3.30 mm).
Figure 7:
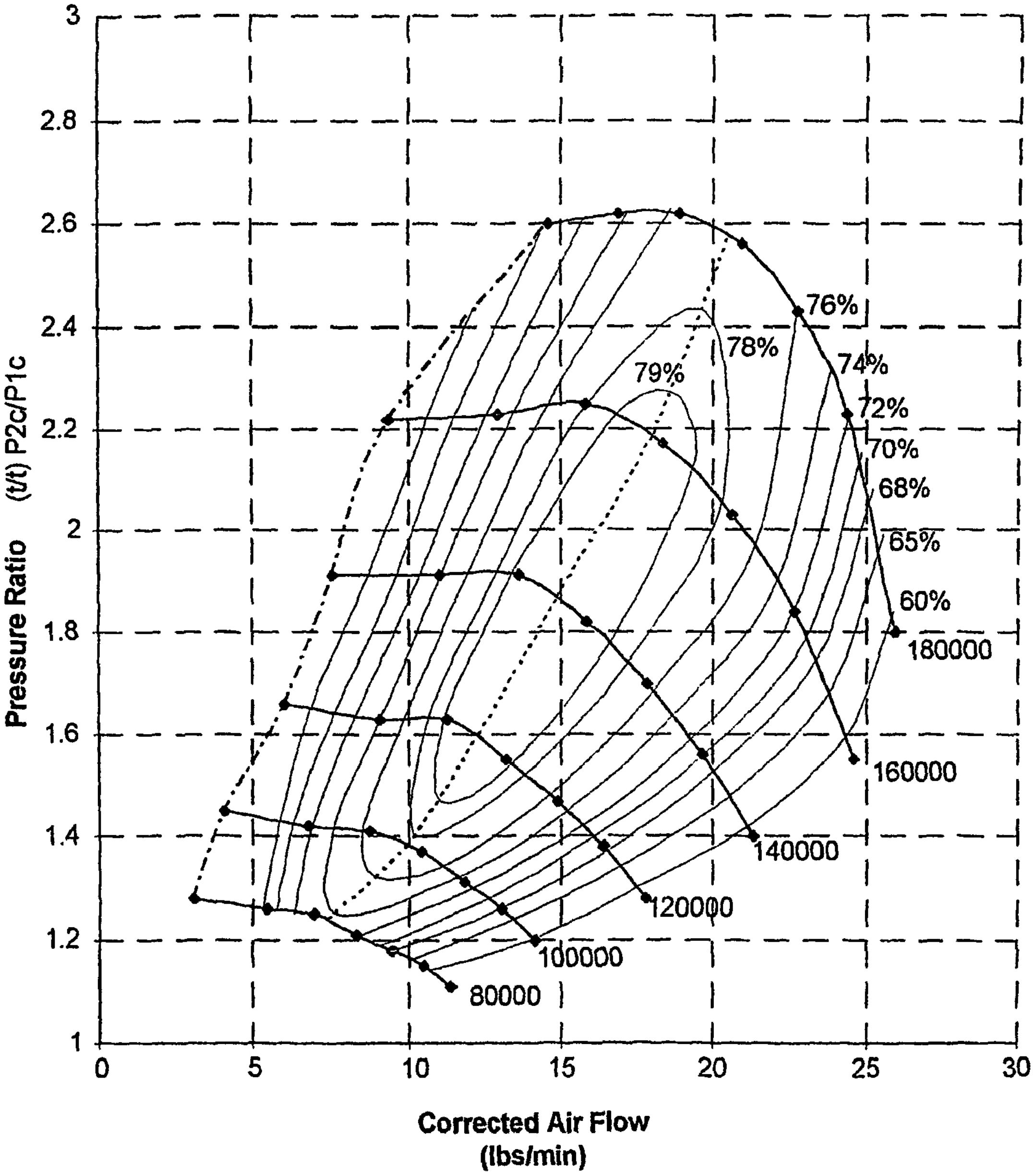
FIG. 7 is a plot of pressure ratio versus corrected air flow for a conventional compressor housing having a diffuser with a parallel wall section (approx. 3.30 mm gap).

FIG. 6 shows a flow map for the exemplary compressor housing 410 having dimensions show in Table 1. FIG. 7 shows a baseline flow map 700 for a conventional compressor housing that may be compared the flow map 600 of FIG. 6.

In the flow maps 600, 700, the exemplary compressor housing and the conventional compressor housing have the same maximum diffuser gap (approx. 3.3 mm) while the converging-diverging compressor has a smaller minimum diffuser gap (approx 2.97 mm). A comparison of the flow map 600 and the flow map 700 indicates that a one-point efficiency gain was achieved by using an exemplary converging-diverging compressor housing having the dimensions shown in Table 1.

Figure 8:
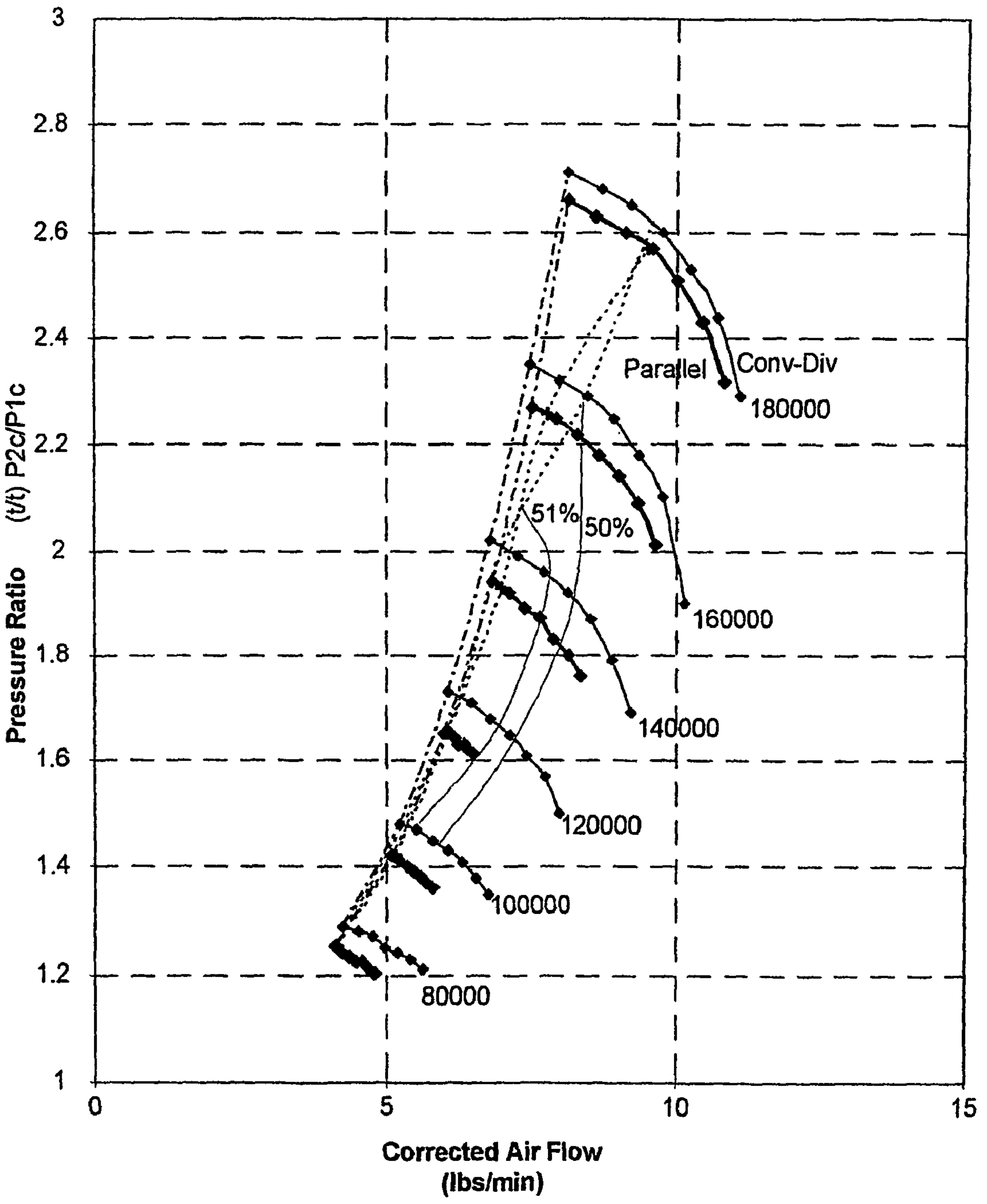
FIG. 8 is a plot of pressure ratio versus corrected air flow comparing results for a conventional compressor housing and an exemplary converging-diverging compressor housing used in a movable backplate variable geometry compressor configuration.

FIG. 8 shows a flow map 800 that includes results for a conventional compressor housing and an exemplary converging-diverging compressor housing used in a movable backplate variable geometry compressor configuration. A movable backplate, variable geometry compressor has a backplate such as item 330 of FIG. 3 that can move axially to thereby adjust the diffuser axial gap h. As gap decreases, a compressor surge line will typically move to the left in a compressor map.

In the comparison of flow map 800, both housings have the same minimum diffuser gap while the converging-diverging housing has a larger gap at the diffuser exit, where the diffuser section joins the scroll section. The flow map 800 indicates that the two housings have similar surge flows; however, a modest improvement occurs with the converging-diverging housing. Further, the pressure ratio of each rotational speed line is significantly higher for the exemplary converging-diverging housing, which indicates that higher efficiencies were achieved. In particular, an increase of compressor efficiency of 8 points was achieved at approximately 80,000 rpm and of 1.5 point at approximately 180,000 rpm. The substantial increase of compressor efficiency at low speeds and low flows is particularly important to passenger vehicle turbochargers. Thus, an exemplary converging-diverging compressor housing that increases efficiency at low speeds and low flows is suitable for use in passenger vehicle turbochargers. Further the choke flow of the compressor was increased due to the efficiency improvement, making the usable compressor map width larger, hence improving the controllability of such a variable geometry device.

Figure 9:
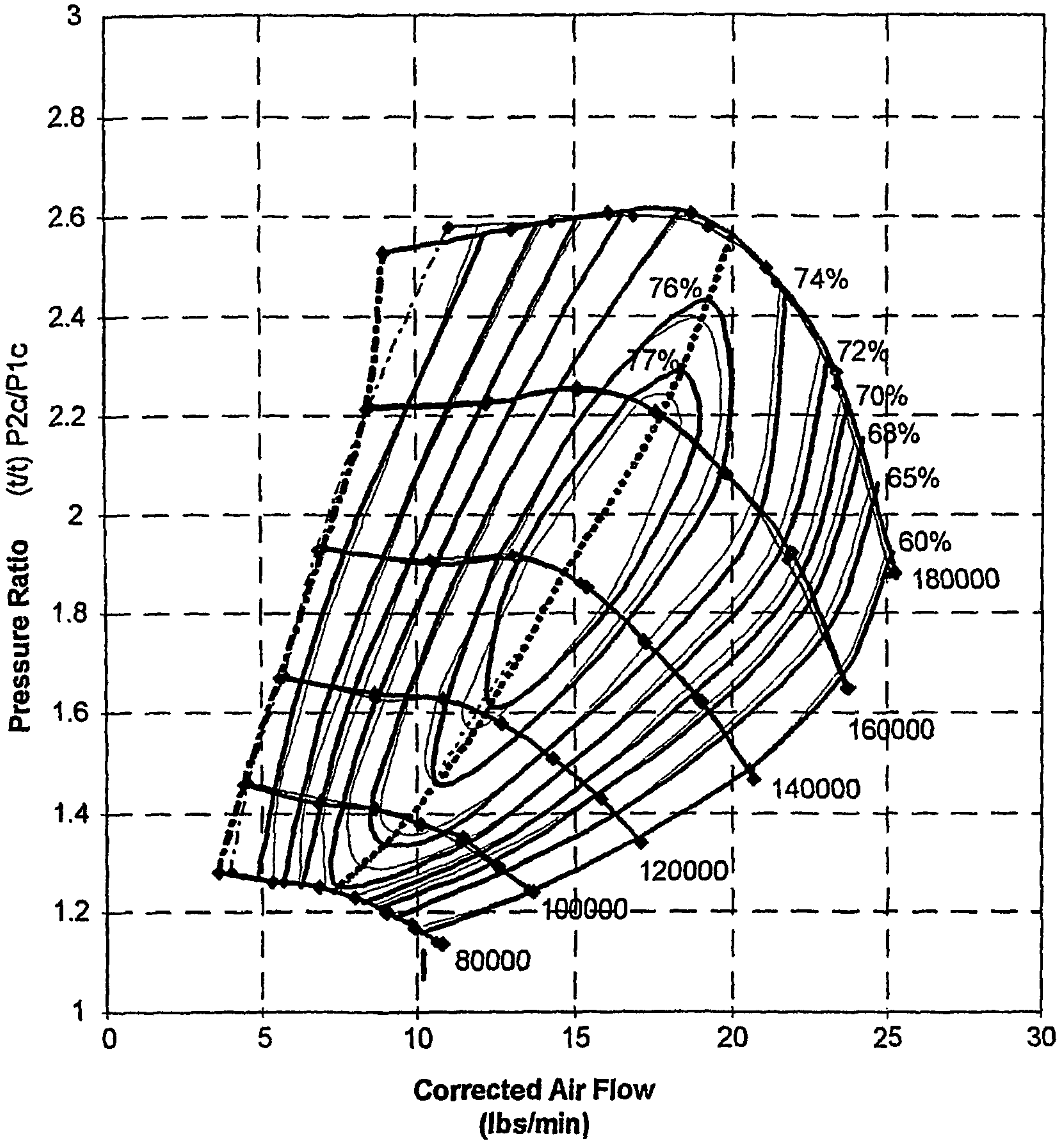
FIG. 9 is an overlay comparison of plots of pressure ratio versus corrected air flow for an exemplary compressor housing having an early pinch or converging wall section (approx. 2.47 mm gap) with a conventional compressor housing.
Figure 10:
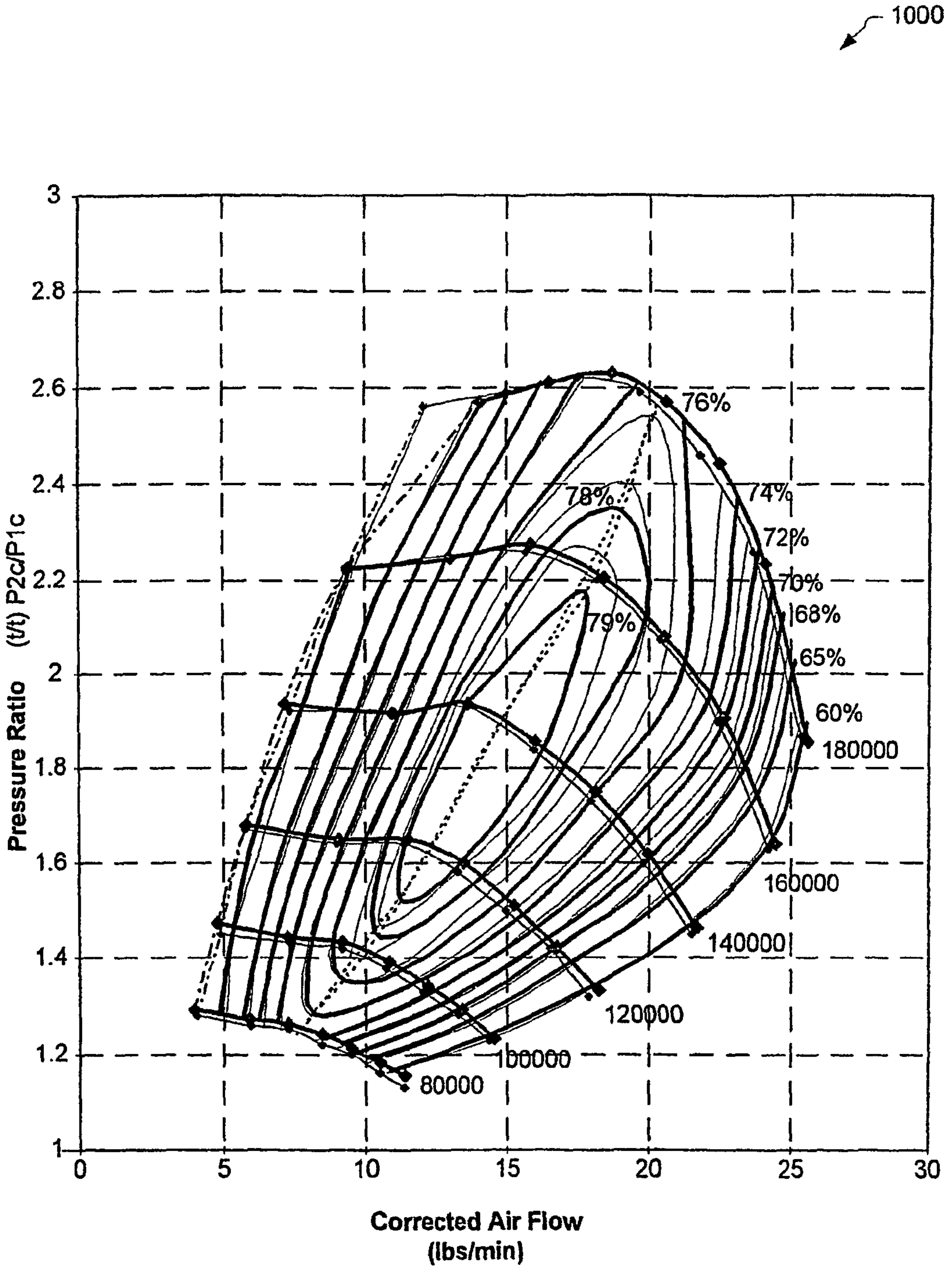
FIG. 10 is an overlay comparison of plots of pressure ratio versus corrected air flow for an exemplary compressor housing having an early pinch or converging wall section (approx. 2.87 mm gap) with a conventional compressor housing.
Figure 11:
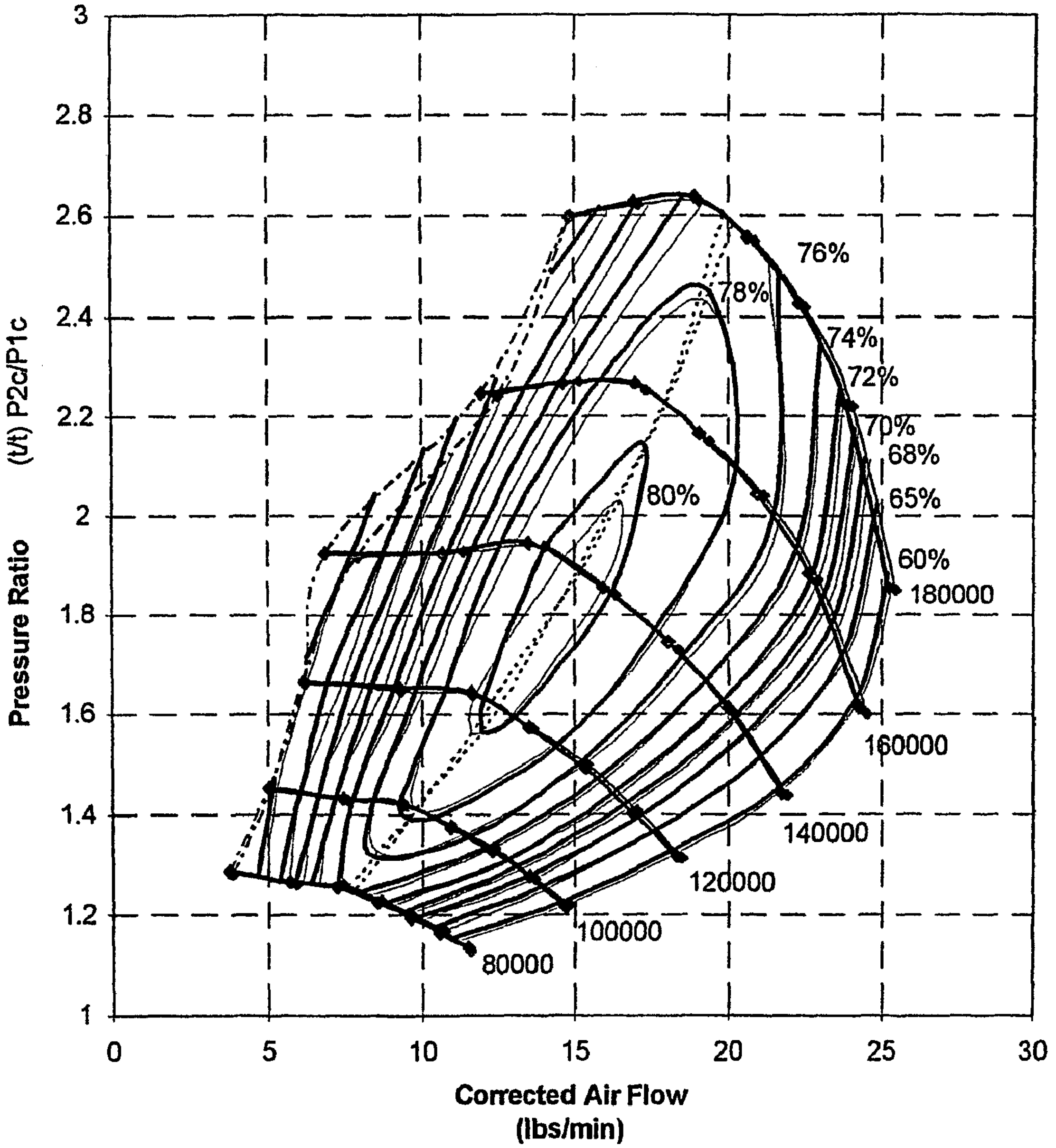
FIG. 11 is an overlay comparison of plots of pressure ratio versus corrected air flow for an exemplary compressor housing having an early pinch or converging wall section (approx. 3.27 mm gap) with a conventional compressor housing.

FIGS. 9-11 show plots for various exemplary early pinch or early converging wall sections. For example, FIGS. 5A and 5B show exemplary early converging wall sections. The plots in FIGS. 9-11 correspond to gas-stand tests that were carried out at three diffuser gaps (at parallel section) of approximately 2.47 mm, approximately 2.87 mm and approximately 3.27 mm. The different diffuser gaps were achieved by machining a housing to remove metal and thereby enlarge the diffuser gap. The plots of FIGS. 9-11 indicate that the compressor efficiency is improved by various exemplary early pinch or early converging wall sections.

FIG. 9 shows a plot 900 of pressure ratio versus corrected air flow for an exemplary compressor housing having an early pinch or converging wall section. In the plot 900, thick lines represent performance of an exemplary converging wall section housing that includes a gap of approximately 2.47 mm while the thinner lines represent performance of a conventional wall section that includes a gap of approximately 2.46 mm. A comparison between the exemplary housing data and the conventional housing date show increases in efficiency for the exemplary housing. For example, the contours for 76% and 77% efficiency have been enlarged.

FIG. 10 shows a plot 1000 of pressure ratio versus corrected air flow for an exemplary compressor housing having an early pinch, i.e. early converging, wall section. In the plot 1000, thick lines represent performance of an exemplary converging wall section housing that includes a gap of approximately 2.87 mm while the thinner lines represent performance of a conventional wall section that includes a gap of approximately 2.86 mm. A comparison between the exemplary housing data and the conventional housing date show increases in efficiency for the exemplary housing. For example, the contours for 76% and 78% efficiency have been enlarged.

FIG. 11 shows a plot 1100 of pressure ratio versus corrected air flow for an exemplary compressor housing having an early pinch, i.e. early converging, wall section. In the plot 1100, thick lines represent performance of an exemplary converging wall section housing that includes a gap of approximately 3.27 mm while the thinner lines represent performance of a conventional wall section that includes a gap of approximately 3.26 mm. A comparison between the exemplary housing data and the conventional housing date show increases in efficiency for the exemplary housing. For example, the contours for 78% and 80% efficiency have been enlarged.

The invention claimed is:

1. A compressor wheel housing for a turbocharger compressor wheel, the housing comprising:

a substantially cylindrical shroud surface definable with respect to a radial dimension and an axial dimension along a rotational axis of a compressor wheel with an origin coincident with a z-plane of a compressor wheel wherein the axial position of the shroud surface decreases with increasing radial position to a compressor wheel blade outer edge radius; and a diffuser surface extending radially outward and axially downward from the cylindrical shroud surface, wherein the diffuser surface includes a minimum diffuser surface axial position at a radial position less than about 1.25 times the compressor wheel blade outer edge radius and wherein the diffuser surface includes a greater axial position at a radial position beyond that corresponding to the minimum axial position, wherein the diffuser surface includes a section with a substantially constant axial position over radii greater than the radius at the minimum axial position.

2. The compressor wheel housing of claim 1 wherein the diffuser surface extends radially outward to a scroll.

3. The compressor wheel housing of claim 1 further comprising a plate that includes a surface proximate to the z-plane and forming a diffuser section in conjunction with the diffuser surface of the housing wherein axial height of the diffuser section is a function of radial dimension and varies with respect to radial dimension for at least a portion of the diffuser section.

4. The compressor wheel housing of claim 3 wherein the axial height decreases and then increases to a substantially constant axial height with respect to increasing radius.

5. The compressor wheel housing of any one of the preceding claims wherein a scroll exists at a radial distance of about 1.8 times the compressor wheel blade outer edge radius.

6. The compressor wheel housing of any one of claims 1 to 4 wherein the diffuser surface has a substantially constant axial position between a radial distance of about 1.2 times the compressor wheel blade outer edge radius and about 1.8 times the compressor wheel blade outer edge radius.

7. The compressor wheel housing of any one of claims 1 to 4 wherein the diffuser surface includes a minimum diffuser surface axial position at a radial position less than about 1.10 times the compressor wheel blade outer edge radius.

8. A compressor wheel housing for a turbocharger compressor wheel, the housing comprising:

a substantially cylindrical shroud surface definable with respect to a radial dimension and an axial dimension along a rotational axis of a compressor wheel with an origin coincident with a z-plane of a compressor wheel wherein the axial position of the shroud surface decreases with increasing radial position to a compressor wheel blade outer edge radius at a shroud surface angle of about 20 degrees or less with respect to the z-plane; and a diffuser surface extending radially outward and axially downward from the cylindrical shroud surface wherein the diffuser surface includes a minimum diffuser surface axial position at a radial position less than about 1.25 times the compressor wheel blade outer edge radius and wherein the diffuser surface approaches the minimum at a diffuser surface angle less than the shroud surface angle and of about 10 degrees or less with respect to the z-plane;

a section with a substantially constant axial position over radii greater than the radial position at the minimum axial position, and a diffuser surface pinch angle with respect to the z-plane, the pinch angle greater than the shroud surface angle and intermediate the compressor wheel blade outer edge radius and the radial position of the minimum diffuser surface axial position.

9. The compressor wheel housing of claim 8 further comprising a plate including a surface proximate to the z-plane and forming a diffuser section in conjunction with the diffuser surface of the housing wherein axial height of the diffuser section is a function of radial dimension and varies with respect to radial dimension for at least a portion of the diffuser section leading to the minimum diffuser surface axial position.

10. The compressor wheel housing of claim 9 wherein the diffuser section includes an axial height that decreases to the minimum diffuser surface axial position and then maintains a substantially constant axial height with respect to increasing radius wherein the substantially constant axial height optionally comprises the minimum.

* * * * *